Nov. 10, 1970  W. E. STAGEBERG  3,539,419
APPARATUS FOR ATTACHING PRESSURE-SENSITIVE ADHESIVE
SHEET MATERIAL SUCCESSIVELY TO LABELS
Filed Sept. 27, 1966  2 Sheets-Sheet 1

INVENTOR.
WILFRED E. STAGEBERG
BY Carpenter,
Kinney & Coulter
ATTORNEYS

Nov. 10, 1970     W. E. STAGEBERG     3,539,419
APPARATUS FOR ATTACHING PRESSURE-SENSITIVE ADHESIVE
SHEET MATERIAL SUCCESSIVELY TO LABELS
Filed Sept. 27, 1966     2 Sheets-Sheet 2
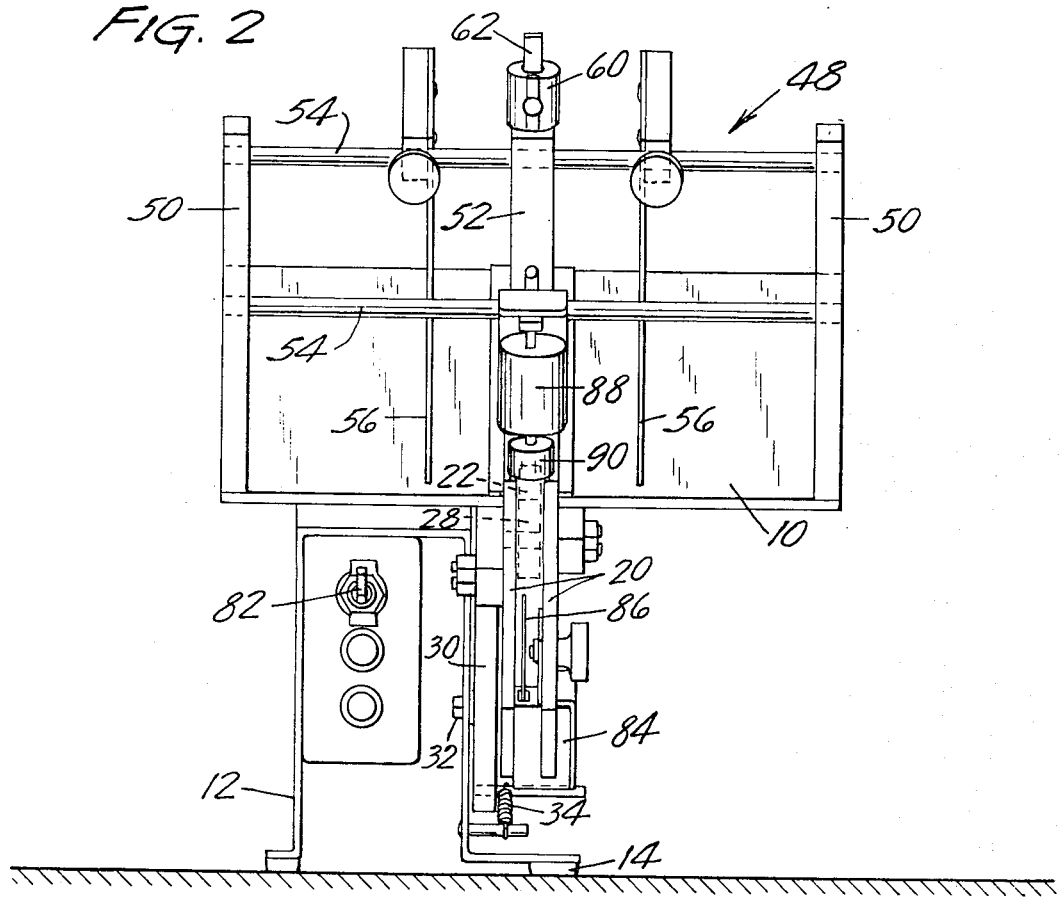
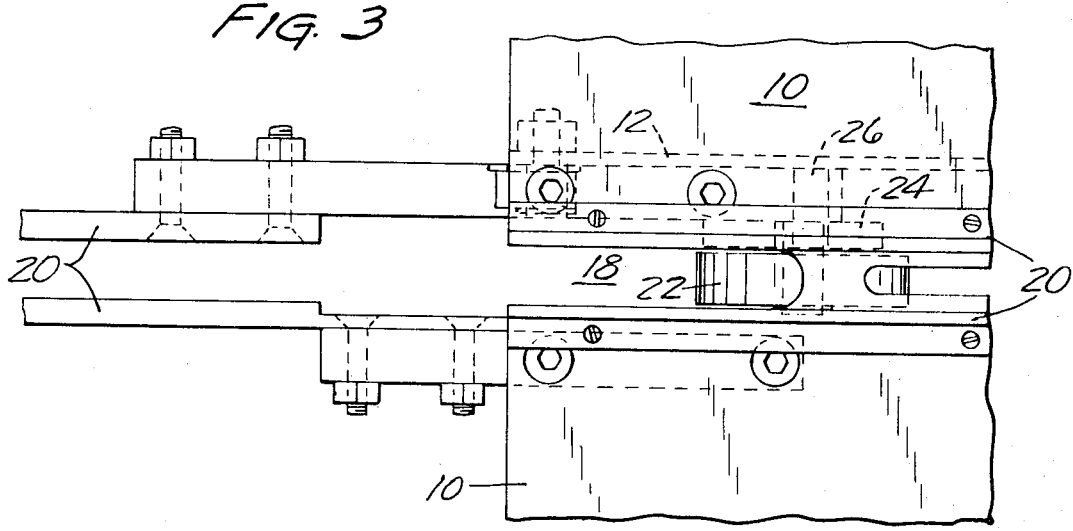
INVENTOR.
WILFRED E. STAGEBERG
BY
Carpenter, Kinney & Coulter
ATTORNEYS United States Patent Office 3,539,419
Patented Nov. 10, 1970

1

3,539,419
APPARATUS FOR ATTACHING PRESSURE-SENSI-
TIVE ADHESIVE SHEET MATERIAL SUCCES-
SIVELY TO LABELS
Wilfred E. Stageberg, Minneapolis, Minn., assignor to
Minnesota Mining and Manufacturing Company, St.
Paul, Minn., a corporation of Delaware
Filed Sept. 27, 1966, Ser. No. 582,323
Int. Cl. B65c 9/20
U.S. Cl. 156—540                                      5 Claims

ABSTRACT OF THE DISCLOSURE

This machine attaches pressure-sensitive adhesive sheet material, known as adhesive transfer tape, successively to labels contained in a hopper as movement of the tape pulls the labels out of the bottom of the hopper. Adhesive transfer tape is sold with a liner adhered to one side of it, and the other side of the transfer tape is adhered by the machine to an edge of the bottom label in the hopper. The liner is thereafter removed from the adhesive transfer tape and moved through the machine to cause the bottom label to be moved as the transfer tape is adhered to the label, and the label is removed from the hopper. As soon as the bottom label is removed, the next successive label is adhered at one edge to the moving transfer tape and the transfer tape is attached to it and it is moved out of the bottom of the hopper. Thus the adhesive transfer tape is attached across one entire side of the label by the operation of the machine without any need for feeding the labels out of the hopper.

---

Figure 1:
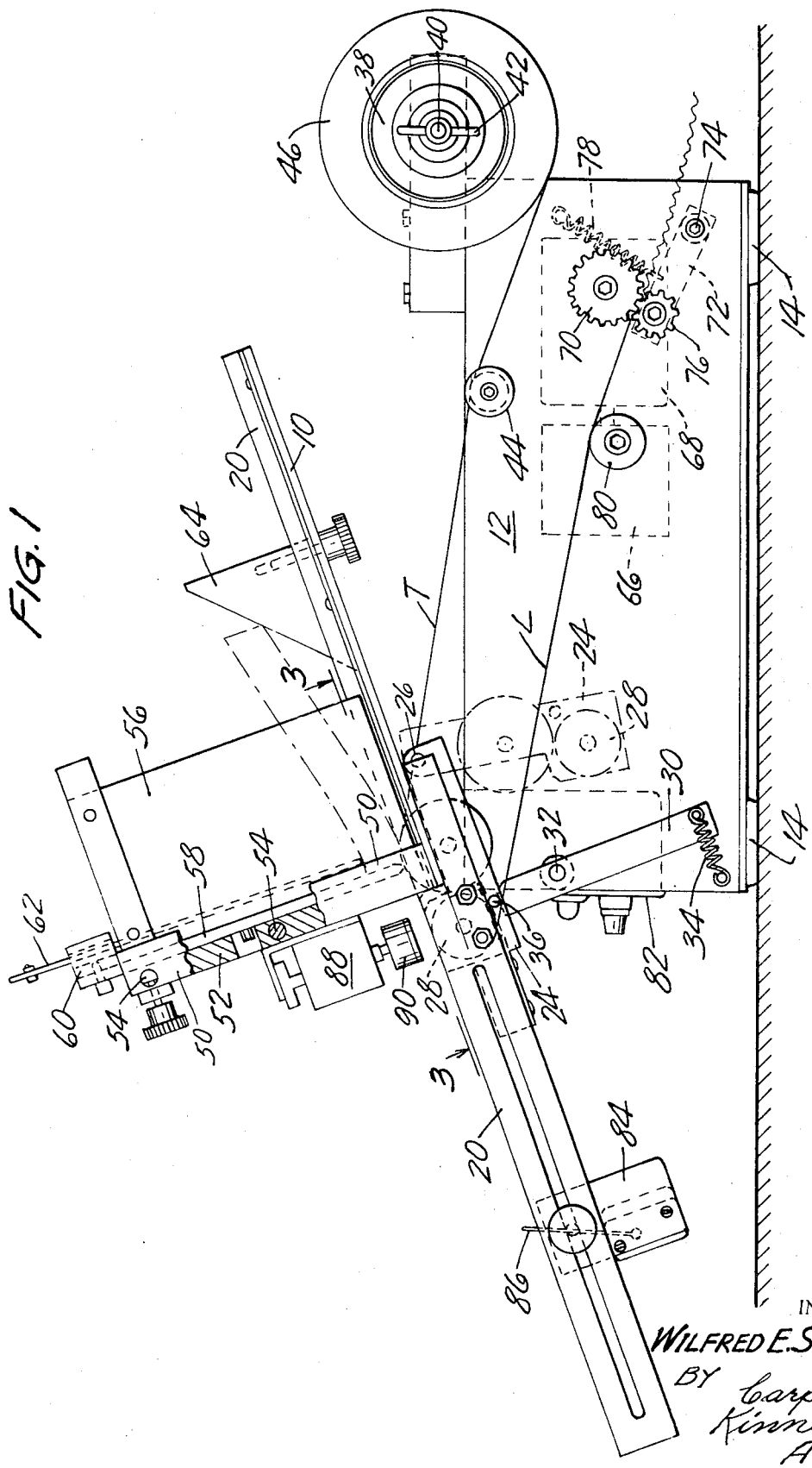

The present invention relates to apparatus for attaching pressure-sensitive adhesive sheet material to a label. The preferred embodiment shown in the attached drawings is useful for attaching pressure-sensitive adhesive sheet material successively to labels as they are removed from a stack of labels.

Pressure-sensitive adhesive sheet material is usually sold with a liner adhered to one side thereof, and that product is usually referred to in the trade as adhesive transfer tape. That pressure-sensitive adhesive sheet material has very little tensile strength itself, and is difficult to work with even if it contains strengthening fibers since the adhesive adheres to anything with which it comes into contact. Consequently, the adhesive sheet material is easier to handle if it has a liner adhered to one side of it. Such a liner is usually composed of, or made up with, a material which has a low affinity for the pressure-sensitive adhesive, so that the liner can easily be removed from the adhesive surface to which it is adhered after the other side of the adhesive has been adhered to a surface or article. Subsequently, another surface or article can then be adhered to the side of the adhesive sheet material from which the liner has been disadhered, and the pressure-sensitive adhesive sheet material forms an adhesive bond between the two surfaces or articles.

One of the surfaces or articles to which the pressure-sensitive adhesive sheet material is often adhered is a label or price tag made up from paper or cardboard stock which has no adhesive on the back of it, and the pressure-sensitive adhesive sheet material is adhered in a narrow strip across the back of the label or tag so that the label or tag can then be adhered to a container, garment or other surface. Additionally, it may at times be desirable to apply pressure-sensitive adhesive sheet material across the entire back surface of a poster or label. The apparatus of the present invention can be used to apply the pressure-sensitive adhesive sheet material in either narrow or wide strips, and a plurality of such machines can be used to

2 put more than one narrow strip of adhesive across the surface of labels, posters, tags and the like.

A machine of the present invention includes means for mounting a supply of pressure-sensitive adhesive sheet material having a liner adhered to one side thereof, means for supporting a label, tag and the like, while the adhesive side of the sheet material is adhered thereto and means for moving the liner away from the sheet material to disadhere the liner from the sheet material after the sheet material has been adhered to the label. The machine can also include a platform for supporting the label, and the platform can contain applying means and a label hopper attached to the platform adjacent to the applying means, so that the pressure-sensitive adhesive sheet material can be applied successively to a plurality of labels during the operation of the machine.

The present invention, and the objects and advantages thereof, will be apparent from the following description of the illustrative embodiment shown in the accompanying drawings, wherein like reference characters refer to similar parts in the corresponding views, and in which drawings:

FIG. 1 is a side elevational view of the apparatus containing a roll of adhesive transfer tape mounted thereon and threaded therein, with some parts shown in section and in dotted lines for illustrative purposes;

FIG. 2 is an end view of the apparatus shown in FIG. 1, looking at the apparatus from the end which is at the left in FIG. 1; and FIG. 3 is an enlarged fragmentary view looking at the machine from the position and in the direction shown by the numbers 3—3 in FIG. 1 and with the applying roller moved out of the operative position to the tape threading position in which it is shown in dotted lines in FIG. 1.

Referring first to FIG. 1, a platform 10 is attached to a base plate 12, and base plate 12 is provided with pads 14 which cushion the machine from the top of a supporting structure on which the machine is placed. The platform 10 is provided with a centrally positioned, elongate aperture 18 which is shown best in FIG. 3. A pair of rails 20 are attached to the top of the platform 10, along each side of aperture 18, and extend therefrom in the manner which is shown in all of the drawings. The width of the aperture 18 is about the same as the distance between the rails 20, and an applying roller 22 is positionable within that aperture.

The applying roller 22 is rotatably attached to a pivot plate 24, and pivot plate 24 is pivotably attached at 26 to the platform 10. A release roller 28 is rotatably attached to the pivot plate 24. A locking lever 30 is pivotably attached at 32 to base plate 12. One end of a spring 34 is attached to one end of locking lever 30 and the other end of such spring is attached to base plate 12. A locking nib 36 is affixed to pivot plate 24, so that the end of locking lever 30 to which the spring 34 is not attached bears against it in order to hold the applying roller 22 and release roller 28 in operative position, which position is that which is shown in solid lines in FIG.1.

The applying roller 22 and release roller 28 are contained within aperture 18 in platform 10 when the pivot plate 24 is held in the operative position which is shown in solid lines in FIG. 1. When locking lever 30 is moved in the counter-clockwise direction when viewed as shown in FIG. 1, pivot plate 24 falls out of the operative position to the position which is shown in dotted lines in FIG. 1, in which position the machine can be threaded with adhesive transfer tape T by placing the liner side of the tape T over applying roller 22 and release roller 28 and then moving the pivot plate 24 to the operative position, thereby preparing the machine for operation.

A tape hub 38 is rotatably attached to a spindle 40, and one end of the spindle 40 is affixed to base plate 12. The other end of the spindle 40 is threaded and is provided with a spring and a wing nut 42, so the rotational movement of tape hub 38 can be retarded by tightening the wing nut 42 until the spring bears against the side of the hub 38 and retards the rotational movement of the tape hub. A guide roller 44 is rotatably attached to base plate 12, and a roll 46 of pressure-sensitive adhesive sheet material having a liner adhered to one side thereof is mounted on tape hub 38 in such manner that the back of the liner contacts the periphery of guide roller 44 as shown in FIG. 1, so that the adhesive side of the pressure-sensitive adhesive sheet material T is facing toward platform 10.

Referring now to FIG. 2, a label hopper 48 is attached to platform 10, and said hopper includes two support bars 50 and a key bar 52 which are attached at right angles to the platform 10. Two alignment bars 54 are attached at right angles through the support bars 50 and the key bar 52. Two label alignment plates 56 are adjustably positionable along the alignment bars 54, and those alignment plates can be positioned on each side of a stack of labels in such manner that the area to which the adhesive is to be attached on each label is positioned adjacent to the key bar 52. A stack of labels is shown in dotted lines in FIG. 1.

A label gate 58 is keyed along the length of key bar 52 in such manner that it is slidable along said key bar, but is held so as to prevent other movement, as is shown in section in FIG. 1. A gate weight 60 is attached to the end of label gate 58 and said gate weight serves to bias the label gate 58 toward the position of applying roller 22 when applying roller is in the operative position. A label weight 62 is journaled through the gate weight 60 and is slidable therethrough so as to be movable with the top label in the label hopper 48 toward the operative position of applying roller 22 as the supply of labels is depleted during the operation of the machine. A label wedge 64 is slidably positionable along platform 10, and said label wedge is positioned under the stack of labels in the manner shown in FIG. 1 and serves to facilitate the removal of the bottom label from the stack thereof.

A motor 66 is attached to base plate 12, and the drive shaft from said motor is attached to a gear box 68 which is also attached to base plate 12. The drive shaft from the gear box 68 is journaled through the base plate 12 and a drive gear 70 is attached to said drive shaft. A gear plate 72 is pivotably attached at 74 to base plate 12, and a driven gear 76 is rotatably attached to the other end of said gear plate. One end of a spring 78 is attached to gear plate 72, and the other end of said spring is attached to base plate 12, so that said spring serves to bias driven gear 76 into contact with drive gear 70, as is shown in FIG. 1.

An adhesive pick-up roller 80 is rotatably attached to base plate 12, and the surface of said roller is coated with plastic material to which the adhesive sheet material will readily adhere, so that any adhesive remaining on the liner will be adhered to the periphery of said roller as the liner moves past said roller in the manner which is shown in FIG. 1. The liner L is then threaded between the drive gear 70 and driven gear 76, so that the operation of motor 66 will cause the liner L to be pulled between those gears, in the direction to the right when viewed as shown in FIG. 1.

A source of electric power is attached to a control switch 82, and said switch is attached to the base plate 12. A label switch 84 is adjustably attached along the rails 20, and an actuator 86 is attached to said switch and protrudes outwardly between said rails, as is shown in FIGS. 1 and 2. A solenoid operated label hold-down device 88 is attached to key bar 52, and a hold-down pad 90 is attached to the actuator from said device. Electric wiring is provided between the control switch 82, motor 66, label switch 84 and hold-down device 88, and said devices are inter-connected in a known manner to provide sequential operation of the machine.

The operation of the machine begins with the adhesive sheet material T and liner L threaded in the machine as shown in FIG. 1. A stack of labels is placed in the label hopper 48, and the label alignment plates 56 are moved into position along each side of the stack of labels so that the area of the label to which the adhesive is to be attached is closest to the key bar 52. Label weight 62 is pulled away from the stack of labels until it is beyond them, and then returned until it rests upon the top of the uppermost label, in which position it is shown in FIG. 1. Label wedge 64 is moved into position so that it contacts the labels which are closest to the platform 10 in the manner which is shown in FIG. 1, and the label which is closest to platform 10 is placed beneath the end of label gate 58 which is closest to applying roller 22. The machine is then ready to be operated.

The motor 66 is then turned on and the operation thereof causes drive gear 70 and driven gear 76 to be rotated, thereby pulling on the liner L and causing the adhesive sheet material T to which the liner is adhered to be moved from the supply roll 46 and toward applying roller 22 and into contact with the label, adhering the adhesive side of the sheet material to the bottom edge of the label. The continuation of that movement of the adhesive sheet material then causes the label to which it is adhered to be moved in the direction from applying roller 22 toward release roller 28, attaching adhesive across the surface of the label. When the label with the adhesive sheet material and liner pass beyond release roller 28, the liner is disadhered from the adhesive sheet material because the label is held by the rails 20 and thus prevented from following the liner around the periphery of the release roller 28. The label to which the adhesive sheet material has been adhered and from which the liner is being disadhered proceeds to be moved along the rails 20 toward label switch 84.

When the trailing edge of the first label passes beneath the end of label gate 58, the leading edge of the next label is adhered to the adhesive sheet material T being carried by the periphery of applying roller 22, so the trailing edge of the first label and the leading edge of the second label are adhered in abutting relationship, with the second label following right after the first label toward label switch 84. Label switch 84 is positioned so that actuator 86 is located about the length of one label beyond release roller 28.

When the leading edge of the first label strikes actuator 86 on label switch 84 the electrical supply to motor 66 is shut off, and the solenoid device 88 is actuated to expel hold-down pad 90. The pad 90 then bears against the leading edge of the second label, pressing the label against the periphery of release roller 28. The first label can then be pulled from the machine causing the adhesive sheet material to be broken between the first and second label. The actuator 86 is spring loaded, so that it is moved back into its original position, deactivating switch 84 as soon as the first label is removed from the machine. The deactivation of label switch 84 causes deactivation of the solenoid 88, and the second label then is free to be moved toward label switch 84. The deactivation of switch 84 and solenoid 88 causes motor 66 to become energized, so the machine begins to operate again to apply adhesive sheet material to the second label in the same manner as the first. The operation is repeated until adhesive sheet material is attached to as many labels as is desired.

The end of label gate 58 which is closest to applying roller 22 is preferably beveled in all directions, as is shown in FIG. 1, in order to provide for a more efficient operation in permitting only one label at a time to pass between it and the applying roller. Also, the fact that the label gate 58 is able to move up and down freely permits it to be self-adjustable to the variance in the thickness of various labels. Additionally, the label wedge 64 is particularly advantageous in that it serves to reduce or remove the drag or friction of the stack of labels on the bottom label because it slides quickly off the incline as soon as it is contacted by the adhesive and begins to be moved. The proper relationship between the label gate 58, label wedge 64 and applying roller 22 is important in obtaining proper label dispensing.

As is evident from the above description of my invention, many variations can be evisioned. For example, the machine can be constructed with various means, such as the platform without an aperture therein, for supporting a label while the adhesive side of the sheet material is adhered to the label. Additionally, the machine can be made to function properly without the need for a separate release roller.

I claim:

1. A machine for attaching pressure-sensitive adhesive sheet material successively to labels, said machine comprising means for mounting a supply roll of pressure-sensitive adhesive sheet material having a liner adhered to one side thereof, a platform for supporting labels while the adhesive side of the sheet material is adhered thereto, said platform having an aperture therethrough, an applying roller rotatably attached to said platform and within said perture, a label hopper attached to one side of said platform and adjacent to said applying roller, said hopper including a slidable label gate for controlling the movement of the labels out of said hopper one at a time and a label wedge to facilitate such movement of a label from one end of a stack of labels, means positioned on the opposite side of said platform from said label hopper for guiding the pressure-sensitive sheet material having a liner adhered to one side thereof from said supply roll around said applying roller, with the liner in contact with said applying roller so that the adhesive side of the sheet material can contact and become adhered to the label in said hopper which is nearest to said applying roller, and means for pulling on the liner to cause the pressure-sensitive adhesive sheet material having a liner adhered to one side thereof to be moved from said supply roll through said guiding means and around said applying roller, causing the label which is nearest to said applying roller and to which the adhesive material has become adhered to be moved out of said hopper, said pulling means also causing said liner to be moved away from the adhesive sheet material and thus disadhered from the sheet material after the sheet material has been adhered to the label.

2. A machine according to claim 1 having a release roller rotatably attached to said platform and in which the pressure-sensitive adhesive sheet material having a liner adhered to one side thereof is guided around said release roller and said applying roller.

3. A machine according to claim 1 containing adjustably positionable switch means for controlling said pulling means.

4. A machine according to claim 1 containing means for holding a second label to which the adhesive sheet material has been attached as the first label to which the adhesive sheet material has been attached is removed from the machine.

5. A machine for attaching pressure-sensitive adhesive sheet material successively to labels, said machine comprising a rotatable hub for mounting a supply roll of pressure-sensitive adhesive sheet material having a liner adhered to one side thereof, a platform for supporting labels while the adhesive side of the sheet material is adhered thereto, said platform having an aperture therethrough, a plate pivotably attached to said platform, an applying roller and a release roller rotatably attached to said plate, means for holding said plate in such position that said applying roller and said release roller are contained within said aperture in said platform, a label hopper attached to one side of said platform and adjacent to said applying roller, means positioned on the opposite side of said platform from said label hopper for guiding the pressure-sensitive sheet material having a liner adhered to one side thereof from said supply roll around said applying roller and said release roller, with the liner in contact with said applying roller and said release roller so that the adhesive side of the sheet material can contact and become adhered to the label in said hopper which is nearest to said applying roller, a motor for pulling on the liner which has been disadhered from the pressure-sensitive adhesive sheet material to cause the pressure-sensitive adhesive sheet material having a liner adhered to one side thereof to be moved from said supply roll through said guiding means and around said applying roller and said release roller, said movement causing the label which is nearest to said applying roller and to which the adhesive material has become adhered to be moved out of said hopper, the pulling of said motor on said liner also causing the liner to be moved away from the adhesive sheet material and thus disadhered from the sheet material as the liner is moved around the release roller while the label is held on said platform and thereby prevented from following said liner.

References Cited

UNITED STATES PATENTS

| | | | |
|---|---|---|---|
| 2,939,599 | 6/1960 | Schluter | 156—542 X |
| 3,043,365 | 7/1962 | Gustafson | 156—540 |
| 3,415,705 | 12/1968 | Ettre | 156—540 |
| 3,415,706 | 12/1968 | Ettre | 156—540 |

BENJAMIN A. BORCHELT, Primary Examiner

S. C. BENTLEY, Assistant Examiner